United States Patent
Logan et al.

(10) Patent No.: US 9,630,601 B2
(45) Date of Patent: Apr. 25, 2017

(54) METHOD FOR OPERATING A VEHICLE BRAKE SYSTEM

(75) Inventors: Jon K. Logan, Howell, MI (US); Patrick J. Monsere, Highland, MI (US); Margaret C. Richards, Royal Oak, MI (US); Jonathan King, Novi, MI (US); Danny Y. Mui, Birmingham, MI (US)

(73) Assignee: GM GLOBAL TECHNOLOGY OPERATIONS, INC., Detroit, MI (US)

( * ) Notice: Subject to any disclaimer, the term of this patent is extended or adjusted under 35 U.S.C. 154(b) by 1405 days.

(21) Appl. No.: 12/418,907

(22) Filed: Apr. 6, 2009

(65) Prior Publication Data

US 2010/0256885 A1 Oct. 7, 2010

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60T 8/40 | (2006.01) |
| B60T 1/10 | (2006.01) |
| B60T 7/04 | (2006.01) |
| B60T 8/26 | (2006.01) |
| B60T 13/74 | (2006.01) |
| B60T 17/22 | (2006.01) |

(52) U.S. Cl.
CPC ............. *B60T 8/4077* (2013.01); *B60T 1/10* (2013.01); *B60T 7/042* (2013.01); *B60T 8/267* (2013.01); *B60T 13/745* (2013.01); *B60T 17/221* (2013.01); *B60T 2270/604* (2013.01); *B60T 2270/82* (2013.01)

(58) Field of Classification Search
USPC .......................................................... 701/70
See application file for complete search history.

(56) References Cited

U.S. PATENT DOCUMENTS

| | | | |
|---|---|---|---|
| 4,720,150 A | 1/1988 | Heubner | |
| 5,558,409 A | 9/1996 | Walenty et al. | |
| 6,226,586 B1 * | 5/2001 | Luckevich | B60T 7/042 188/72.1 |
| 6,241,323 B1 * | 6/2001 | Wagner | B60T 8/3275 303/113.4 |
| 6,456,921 B1 | 9/2002 | Bodie et al. | |
| 2007/0272457 A1 * | 11/2007 | Kodama | B60K 6/44 180/65.31 |

(Continued)

*Primary Examiner* — Imran Mustafa
(74) *Attorney, Agent, or Firm* — Reising Ethington, P.C.; Lionel Anderson (57) ABSTRACT

A method that compensates for fluid pressure variations in a vehicle brake system so that the fluid pressure, brake torque and/or brake force at the wheel more accurately reflects that requested by the driver. In an exemplary embodiment, the method determines the braking intent of the driver, determines a current stage of the braking event (e.g., an apply stage, release stage, etc.), uses the braking event stage and the driver braking intent to select a pressure compensation, and uses the pressure compensation to generate compensated brake command signals for operating the vehicle brake system. This method is well suited for use with brake-by-wire systems, such as an electrohydraulic braking (EHB) system.

16 Claims, 3 Drawing Sheets

(56) References Cited

U.S. PATENT DOCUMENTS

| | | | | |
|---|---|---|---|---|
| 2007/0273204 A1* | 11/2007 | Kodama | .................. | B60K 6/48 |
| | | | | 303/146 |
| 2008/0265664 A1* | 10/2008 | Fulmer | ..................... | B60T 8/38 |
| | | | | 303/113.4 |
| 2009/0079258 A1* | 3/2009 | Tsuruhara | ............. | B60T 8/3225 |
| | | | | 303/9.61 |
| 2009/0096279 A1* | 4/2009 | Hosaka | ..................... | B60T 7/12 |
| | | | | 303/11 |

* cited by examiner

METHOD FOR OPERATING A VEHICLE BRAKE SYSTEM

This invention was made with U.S. Government support under Agreement No. GMT101X TMH, awarded by the Fuel Cell Vehicle Program. The U.S. Government may have certain rights in this invention.

TECHNICAL FIELD

The present invention generally relates to a vehicle brake system and, more particularly, to a method that compensates for fluid pressure variations in a vehicle brake system.

BACKGROUND

Fluid pressure variations in a vehicle brake system may cause the amount of brake torque or brake pressure requested by the driver to differ from that actually experienced out at the vehicle wheel or corner. There are a variety of potential sources of fluid pressure variations, including those that result in more fluid pressure than that requested by the driver and those that result in less fluid pressure than requested.

Hydraulic gain or amplification is an example of a source that may result in too much fluid pressure; that is, a vehicle brake system that uses hydraulic gain to boost the fluid pressure can provide more brake torque or brake force at the wheel than requested at the brake pedal. Conversely, frictional loss, which may occur in a master cylinder, actuator, valve, etc., is an example of a source that may cause the fluid pressure at the wheel to be less than that requested at the brake pedal. If the fluid pressure variations are significant enough, they may become noticeable to the driver.

SUMMARY OF THE INVENTION

According to one embodiment, there is provided a method for operating a vehicle brake system. This method generally comprises the steps of: (a) determining a driver braking intent; (b) determining a pressure compensation that compensates for fluid pressure variations in the vehicle brake system; (c) using the driver braking intent and the pressure compensation to generate compensated brake command signals; and (d) operating one or more aspects of the vehicle brake system according to the compensated brake command signals.

According to another embodiment, there is provided a method for operating a vehicle brake system. This method generally comprises the steps of: (a) determining a driver braking intent; (b) determining a braking event stage that is representative of a discrete stage, phase, segment and/or portion of a braking event; (c) generating compensated brake command signals for the driver braking intent, wherein the compensated brake command signals are designed to compensate for fluid pressure variations that occur in the vehicle brake system during that particular braking event stage; and (d) operating one or more aspects of the vehicle brake system according to the compensated brake command signals.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method described herein compensates for fluid pressure variations in a vehicle brake system so that the fluid pressure at the wheel more accurately reflects that requested by the driver. Although this method is particularly well suited for use with an electrohydraulic braking (EHB) system, it should be appreciated that it may be used with any number of other braking systems and is not limited to this particular embodiment. For example, the present method may be used with other brake-by-wire and non-brake-by-wire systems (e.g., electromechanical braking (EMB) systems having electrically-driven calipers), regenerative and non-regenerative braking arrangements (e.g., those found in hybrid vehicles, electric vehicles, etc.), as well as other brake technologies (e.g., vehicle brake systems that use disk brakes, drum brakes or a combination thereof). These are only some of the possibilities, as the present method could be used with other vehicle brake systems as well.

Figure 1:
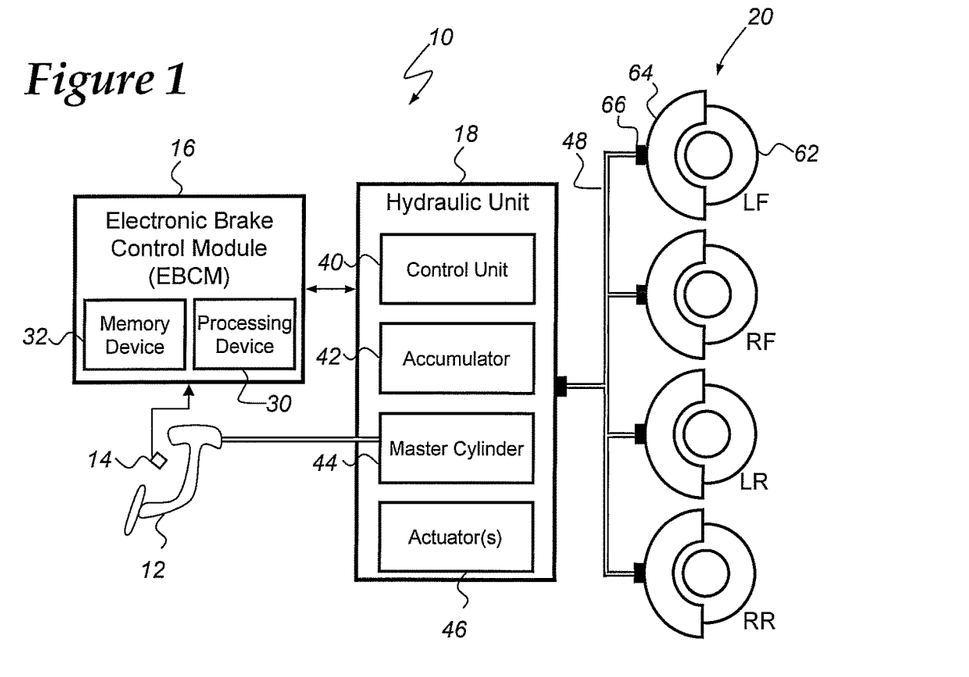
FIG. 1 is a block diagram of an exemplary vehicle brake system.

With reference to FIG. 1, there is shown a block diagram of an exemplary vehicle brake system 10 that is an electrohydraulic braking (EHB) system and generally includes a brake pedal 12, a brake pedal sensor 14, an electronic module 16, a hydraulic unit 18, and a disc brake unit 20. Although not shown here, vehicle brake system 10 may be part of a hybrid vehicle that utilizes a combination of frictional and regenerative braking forces to slow down the vehicle. In such an arrangement, the frictional braking forces are generated in a conventional manner and counteract the forward momentum of the vehicle through friction created by disk brakes, drum brakes, etc. The regenerative braking forces are generated by operating an electric motor in a reverse direction so that it acts as a generator. This creates an electromagnetically-derived torque that acts against the forward momentum of the vehicle (this process also charges a battery that can later be used to power the vehicle). It is not necessary, however, for vehicle brake system 10 or the present method to be used in a regenerative braking arrangement, as that is only one possible embodiment.

Brake pedal 12 is a pedal or lever that is operated by the driver and, according to this particular embodiment, is mechanically coupled to a primary piston in a master cylinder of hydraulic unit 18, as will be explained in more detail. In a brake-by-wire application, brake pedal 12 may also be mechanically coupled to a brake pedal simulator or emulator by way of a spring mechanism or the like for conveying the expected mechanical feel to the driver. The brake pedal simulator may also include other mechanical and/or electronic components, including sensors, etc.

Brake pedal sensor 14 provides vehicle brake system 10 with a brake signal that is generally representative of the position, movement, exerted force, and/or state of brake pedal 12 (hereafter collectively referred to as 'brake status'). Any number of different types of brake pedal sensors may be used; these include non-contact-type sensors (e.g., optical sensors, electromagnetic sensors, etc.), contact-type sensors (e.g., potentiometers, contact switches, etc.), as well as those that measure the force that the driver exerts against the brake pedal, to name a few.

Electronic module 16 is an electronic device or unit that is located in the vehicle and includes an electronic processing device 30 and a memory device 32. Electronic processing device 30 may control certain operational aspects of vehicle brake system 10 by executing various electronic instructions, including those of the present method. Some examples of suitable electronic processing devices include digital and analog microprocessors, microcontrollers, application specific integrated circuits (ASICs), or any other processing device known in the art. Memory device 32 could include any type of electronic memory storage means and may be used to store some of the electronic instructions that make up the present method, as well as sensor readings, look-up tables, and any other data structure that may hold data used by the method described herein. According to one embodiment, electronic module 16 is an electronic brake control module (EBCM) that modulates fluid pressure in the vehicle brake system via command signals sent to hydraulic unit 18. Electronic brake control module (EBCM) 16 could be a separate electronic module or it could be integrated into a larger module, device, or system such as a traction control system or antilock braking system (ABS).

Hydraulic unit 18 is mounted in the vehicle and is coupled to a hydraulic system that can drive brake pistons located at each of the vehicle wheels or corners. Although hydraulic unit 18 is schematically shown as having a separate hydraulic control unit 40, accumulator 42, master cylinder 44, and actuator(s) 46 co-located with one another, it should be appreciated that any combination of these and/or other devices could instead be provided according to some other arrangement known in the art. For example, hydraulic control unit 40 could be integrated within EBCM 16 or some other module and be connected to actuator(s) 46 via electrical connections. Hydraulic control unit 40 interacts with EBCM 16 and may act as an intermediary or driver for the various electromechanical actuators and devices in hydraulic unit 18. In one example, hydraulic control unit 40 receives command signals from EBCM 16, processes those signals, and uses them to operate actuator(s) 46. Skilled artisans will appreciate that hydraulic control unit 40 may perform any number of different tasks and execute a variety of different instructions, including those of the present method.

Accumulator 42 uses compressed gas and hydraulic fluid to provide fluid pressure for the hydraulic system, as is known in the art. According to an exemplary embodiment, accumulator 42 includes a cylinder and a free riding piston that separates a gas on one side of the piston—for example, nitrogen—and hydraulic fluid on the other side. The compressible gas is introduced through a valve at one end of the cylinder while the hydraulic fluid enters at the other end of the cylinder. As the hydraulic fluid enters the cylinder, it forces the free riding piston against the compressible gas, compressing it to a predetermined pressure. In a non-emergency situation, accumulator 42 may be set to a predetermined pressure, such as 140-180 bar; this in turn, enables the hydraulic system to have on-demand pressure when requested by hydraulic control unit 40. In an emergency situation, accumulator 42 may store energy for a limited number of brake applications in the event the engine stops running. Other devices and arrangements may be used, as a nitrogen-based accumulator is simply exemplary.

Master cylinder 44 converts pressure exerted by the foot of the driver into hydraulic or fluid pressure that can be used to drive the brakes located at one or more of the vehicle's wheels or corners. There are many different types of master cylinder arrangements that may be used, including the exemplary one shown in FIG. 2. According to that embodiment, master cylinder 44 generally includes a primary piston 70 and a pair of side-by-side secondary pistons 72, 74. Primary piston 70 is mechanically coupled to brake pedal 12 and is designed to move back-and-forth in chambers 76 and 78 in response to engagement by the driver's foot. When primary piston 70 advances within chamber 76, the fluid pressure in that chamber increases. This pressurized hydraulic fluid may be in fluid communication with sensors and other components of hydraulic unit 18 via outlet 80. Relative movement between primary piston 70 and the walls of chamber 76, which may include one or more circumferential seals 82 or the like, can generate friction that works against the movement of the primary piston and hence movement of the brake pedal. If not compensated, these frictional losses—as well as fluidic losses, hysteresis and/or other losses and inefficiencies—can result in a brake torque or brake force at the wheel that is different from that requested at the brake pedal.

Figure 2:
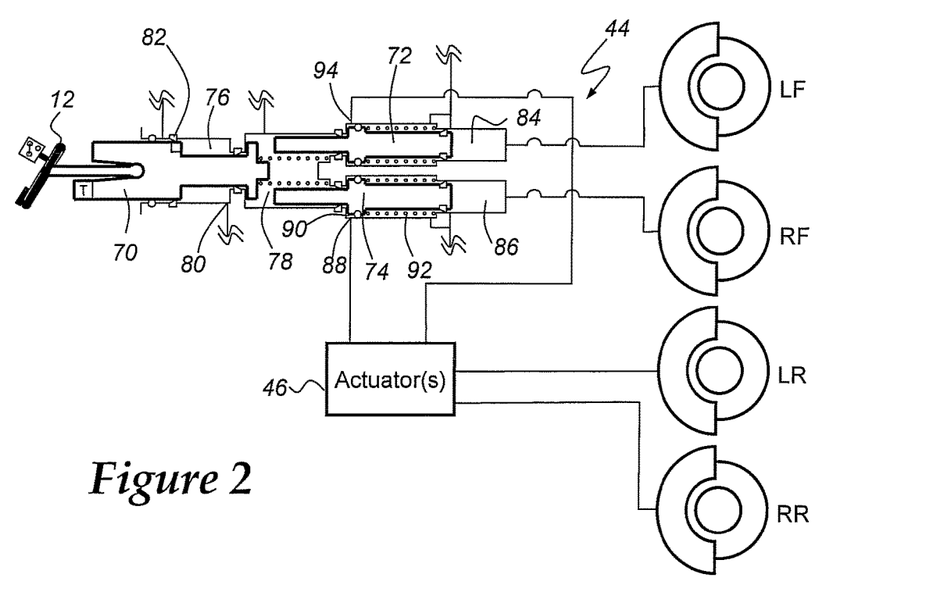
FIG. 2 is a cross-sectional view of an exemplary master cylinder that may be used with the vehicle brake system of FIG. 1.

Secondary pistons 72, 74 are generally smaller than primary piston 70 and are designed to move back-and-forth within chamber 78 and chambers 84, 86, respectively. It should be appreciated that the following description of secondary piston 74 applies to secondary piston 72 as well. Fluid inlet 88 provides pressurized hydraulic fluid from hydraulic unit 18 to a sealed chamber 90. When pressurized hydraulic fluid fills sealed chamber 90, it exerts a force on secondary piston 74 that causes it to advance against the bias of a spring 92 and to correspondingly pressurize the fluid in chamber 86, which is in fluid communication with one of the front disk brake units. The increase in fluid pressure out at a front disk brake unit 20 causes a piston in that unit to drive a caliper and brake pad against a rotor and create a frictional force that slows the vehicle down. An additional description of this operation is provided below.

Actuator(s) 46 are electromechanical devices that control the fluid pressure in hydraulic lines 48 and, according to this particular embodiment, are controlled by command signals provided by control unit 40 and/or EBCM 16. Depending on the particular arrangement, actuator(s) 46 can include any combination of valves, pumps, and other devices that can be controlled by electronic command signals and can manipulate the fluid pressure in the hydraulic system. In one embodiment, actuator(s) 46 include a boost valve for fluidly connecting accumulator 42 to hydraulic lines 48 and providing elevated fluid pressure in the hydraulic system, a number of isolation valves for fluidly connecting the output of the boost valve to the disk brake units located at each of the vehicle wheels, and a number of dump valves for releasing the fluid pressure in the hydraulic system once a braking event is finished. Other components and devices could be included within actuator(s) 46.

Disk brake unit 20 generally includes a rotor 62, caliper 64, piston 66, and brake pads (not shown) and may be part of an electrohydraulic braking (EHB) system or some other brake-by-wire system. As is appreciated by skilled artisans, a tire-wheel assembly (not shown) is attached to a hub with several lug nuts so that the tire, wheel, hub, and rotor 62 can all co-rotate together. Brake caliper 64 straddles rotor 62 and carries brake piston 66 so that a compressive and frictional brake force can be applied by brake pads to opposing sides of the rotor during a braking event. The frictional brake forces slow the rotation of rotor 62 and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. It should be appreciated that the method and system described herein are not limited to use with disk brake systems and could be used with other braking systems and arrangements, including drum brake systems.

In general operation, a driver engages brake pedal 12 to slow down or stop the vehicle. Brake pedal 12 is mechanically coupled to primary piston 70 in master cylinder 44 such that depression of the brake pedal causes the primary piston to advance and compress hydraulic fluid in chamber 76. In this particular example, chamber 78 is connected to a fluid reservoir and therefore does not experience a corresponding increase in fluid pressure. The depression or engagement of brake pedal 12 is sensed by brake pedal sensor 14, which provides the system with a brake pedal signal that is generally representative of the driver's braking intent. In one embodiment, the brake pedal signal is sent to EBCM 16 which uses information from the signal to execute one or more algorithms, such as that described herein. From these algorithms or methods, EBCM 16 generates one or more command signals that are provided to hydraulic control unit 40 and are used to control one or more actuator(s) 46, such as a boost valve. The boost valve, along with a number of isolation and dump valves, can control the fluid pressure in hydraulic lines 48 which includes hydraulic lines leading to the front and/or rear wheels. By controlling the fluid pressure in hydraulic lines 48, the system is able to control the brake force and ultimately the brake torque exerted on brake rotors 62.

In the case of the front wheels, the hydraulic lines are connected to inlets 88, 94 which are on the upstream sides of secondary pistons 72, 74, respectively. An increase in fluid pressure at inlets 94, 88 causes secondary pistons 72, 74 to advance against the bias of a pair of springs and increase the pressure in chambers 84, 86, respectively. The relationship between the fluid pressures at inlets 94, 88 and in chambers 84, 86 may be influenced by several factors, including the surface area of the secondary pistons on each of their respective ends. Chambers 84, 86 are in fluid communication with hydraulic lines that connect to the front disk brake units. In the case of the rear wheels, the pressurized hydraulic lines can lead directly from hydraulic unit 18 to the rear disk brake units; that is, they do not need to pass through a master cylinder arrangement like that used with the front brakes.

If a fluid leak or other malfunction were to occur, the driver could still engage the front brakes by depressing the brake pedal to such an extent that primary piston 70 physically engages the ends of secondary pistons 72, 74. Further advancement by primary piston 70 causes secondary pistons 72, 74 to move so that they compress the hydraulic fluid in chambers 84, 86, respectively. In this way, master cylinder 44 may act as a redundant failsafe in the event that there is a problem with the hydraulic system. The particular design of the master cylinder can affect the amount of hydraulic gain or amplification in the vehicle brake system (hydraulic gain generally refers to the fluid pressure differential on different sides of a hydraulic device; typically, an outlet side of the device sees a higher fluid pressure than an inlet side). Some vehicle brake systems are purposely designed to provide excess or surplus hydraulic gain. While this additional hydraulic gain can be useful during operation in a manual or failsafe mode, it should be compensated during normal operation so that the brakes do not feel 'grabby' or overly aggressive to the driver. The method described below compensates for all types of fluid pressure variations in a vehicle brake system (e.g., those caused by hydraulic gain, frictional losses, etc.) so that the fluid pressure at the wheel accurately reflects that requested by the driver.

Again, it should be appreciated that the preceding descriptions of vehicle brake system 10, hydraulic unit 18, master cylinder 44, and the other components and devices are exemplary and are only provided for purposes of illustration. The method and system described herein may be used with any number of different brake systems and are not limited to these exemplary embodiments.

Figure 3:
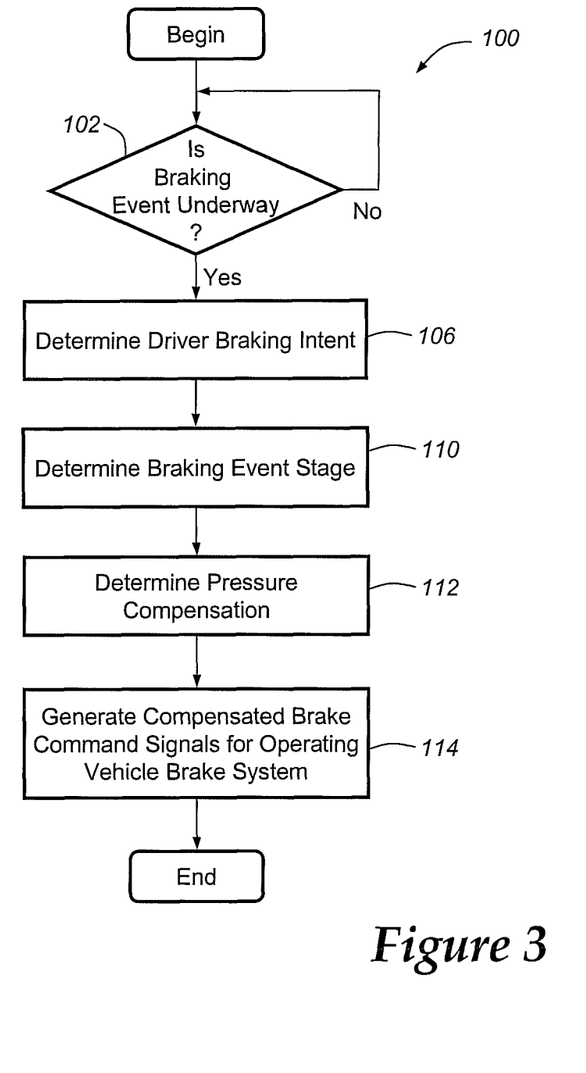
FIG. 3 is a flowchart of an exemplary method that may be used to operate the vehicle brake system of FIG. 1.

Turning now to FIG. 3, there is shown a flowchart of an exemplary method 100 for operating a vehicle brake system and, more particularly, a method that compensates for fluid pressure variations in the vehicle brake system. As already explained, frictional losses in master cylinder 44 can result in a fluid pressure decrease while hydraulic gain in the master cylinder can result in a fluid pressure increase. These and other fluid pressure variations can result in a brake torque or brake force at the wheels that is different from that actually requested or intended by the driver. Because of the decoupled nature of a brake-by-wire system, such as vehicle brake system 10, method 100 is able to compensate for such fluid pressure variations by manipulating the command signals that operate hydraulic unit 18. Again, method 100 may be used with any brake-by-wire system or other system that uses a brake pedal simulator, including electromechanical braking (EMB) systems, for example.

Beginning with step 102, the method determines if a braking event is underway (i.e., is a braking event occurring or anticipated). For example, step 102 may receive brake signals from brake pedal sensor 14, where the brake signals are generally representative of the position, movement, exerted force, and/or state of the brake pedal (collectively the 'brake status'). In this example, the brake status is representative of the driver's manual engagement of brake pedal 12 and is indicative of the driver braking intent. Any number of different techniques may be used to determine if a braking event is underway, including the use of wheel speed or vehicle speed data, vehicle acceleration, etc.

If no braking event is underway, then the method returns to step 102 for further monitoring. If a braking event is underway, then step 106 determines the driver braking intent. Driver braking intent may be expressed using one of a variety of suitable measurements, including brake torque, brake force, fluid pressure, etc. According to one embodiment, EBCM 16 uses brake signals from brake pedal sensor 14 to determine the driver braking intent. As explained above, fluid pressure variations may exist within vehicle brake system 10; including variations that cause the fluid pressure at the wheels to be higher or lower than that desired by the driver. Thus, the driver braking intent measured in this step may be corrupted by these variations or, for other reasons, may not result in the requested fluid pressure out at the vehicle wheels. In order to implement the driver's true braking intent, method 100 attempts to remove or otherwise compensate for these variations.

Next, step 110 determines the current stage or phase of the braking event. A "braking event stage" broadly includes any discrete stage, phase, segment and/or portion of a vehicle braking event. For example, a braking event may be divided into three discrete braking event stages: an apply stage (e.g., when the driver is depressing the brake pedal across a range of rotational positions), a steady-state stage (e.g., when the driver is engaging the brake pedal with a constant pressure so that it maintains a constant rotational position), and a release stage (e.g., when the driver is letting up on the brake pedal so that it returns to a non-engaged position). These are, of course, only exemplary braking event stages, as other combinations of stages could be used including ones with fewer or greater numbers of discrete stages. The braking event stage may be determined by EBCM 16 or some other device and can be helpful in selecting the most appropriate pressure compensation, as will be explained.

In a first exemplary embodiment where vehicle brake system 10 is part of an electrohydraulic braking (EHB) system on a vehicle with a standard internal combustion engine (i.e., a non-regenerative or non-hybrid engine), EBCM 16 receives brake status information from one or more sources such as brake pedal sensor 14 and, based on that information, determines the current braking event stage. The brake status information may be stored in memory device 32 or elsewhere so that a history or chronology of the braking event can be developed; this may further help determine the current braking event stage. Consider a typical braking event where a driver engages the brakes before entering a turn (apply stage), maintains a constant brake force through the turn (steady-state stage), and then releases the brakes once the turn is complete (release phase). Using brake status information from brake pedal sensor 14, as well as information from sources like an electronic stability control (ESC) module, etc., EBCM 16 can determine the braking event stage at any particular point in time. Skilled artisans will appreciate that a variety of techniques and models could be used for processing this information and making this determination.

In a second exemplary embodiment where vehicle brake system 10 is part of an electrohydraulic braking (EHB) system on a hybrid vehicle or other type of vehicle that uses a regenerative braking setup (not shown), EBCM 16 receives information from a regenerative braking system and, based on that information, determines the current braking event stage. To illustrate, when the driver engages brake pedal 12 to request a certain amount of brake force, a regenerative braking system determines the appropriate blend of frictional and regenerative forces needed to implement the driver braking intent. If, for example, the driver is driving at a relatively slow speed and wishes to bring the vehicle to a gradual stop, the regenerative braking system could instruct the electric motors/generators at the wheels to create 75% of the overall brake torque and the vehicle brakes to create the other 25%; of course, these percentages could be adjusted to meet the specific operating conditions being experienced by the vehicle. Skilled artisans will appreciate that any number of different methods and techniques could be used to determine the most optimal blend or combination of frictional and regenerative braking forces. In this regenerative embodiment, EBCM 16 uses information from the regenerative braking system (which may be part of a powertrain module, etc.), as well information from other sources like brake pedal sensor 14, to determine the current stage or phase of the braking event.

Next, step 112 determines a pressure compensation to compensate or otherwise mitigate the effects of fluid pressure variations in vehicle braking system 10. In an exemplary embodiment, step 112 selects a look-up table or other data structure based on the previously-determined braking event stage (e.g., a separate look-up table for each discrete braking event stage), and uses the look-up table to determine an appropriate pressure compensation. This approach can be useful in instances where vehicle brake system 10 behaves differently and exhibits different pressure variation characteristics in different phases of its operation; that is, different braking event stages. The look-up tables or other data structures can be arranged and created according to a number of different ways.

In one example, each of the different look-up tables is a two-dimensional data structure that correlates a driver's actual braking intent (input) with the pressure compensation that is needed in order to implement that driver braking intent (output). For instance, consider the exemplary graph in FIG. 4, which plots input on the x-axis and output on the y-axis, and illustrates the contents of a two-dimensional look-up table. This particular graph includes four separate plots. A first plot 202 represents the actual fluid pressure variation characteristics of the vehicle brake system (e.g., if the driver requests 40 bar, the system if not compensated would deliver about 47 bar). Skilled artisans will appreciate that plot 202 illustrates the hysteresis in the system where the clockwise direction is representative of a brake apply/steady-state/release sequence. A second plot 204 represents a sample relationship where the driver braking intent (input) matches the pressure compensation (output); that is, an ideal system without any gains or losses. A third plot 206 represents a fluid pressure relationship for use in an 'apply' braking event stage. And a fourth plot 208 represents a fluid pressure relationship for use in a 'release' braking event stage. If brake pedal sensor 14 senses a driver braking intent of 30 bar (input) and EBCM 16 has determined that the braking event is currently in an apply stage, then plot 206 indicates that a pressure compensation of only 28 bar is needed to implement the driver's request and offset fluid pressure variations in the system. In the same example, if EBCM 16 determines that the braking event is in a release stage then a pressure compensation of only 26 bar, is needed. In both of these examples, step 112 determines a pressure compensation (output) that is less than the fluid pressure requested by the driver (input). This suggests that the hydraulic gain in the system is greater than the frictional and other losses. Of course, the output may be greater than the input as well.

Figure 4:
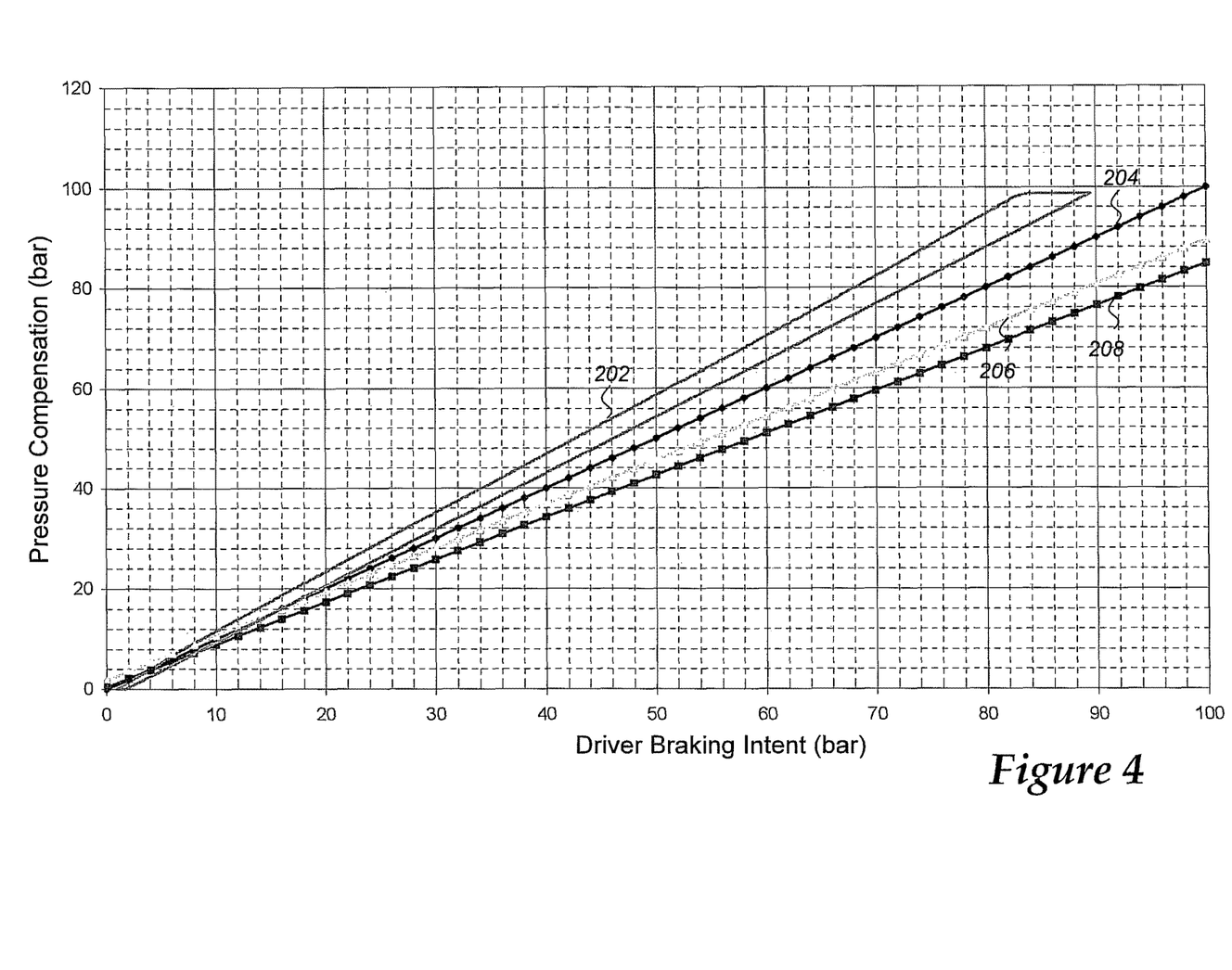
FIG. 4 is a graph showing several exemplary plots that illustrate fluid pressure variations associated with different stages of a braking event.

The look-up tables or other data structures may be empirically derived from testing during development of the vehicle (e.g., static information that generally does not change) or during the operational lifetime of the vehicle (e.g., dynamic information that is updated, modified, changed, etc.). For instance, the fluid pressure at different points within vehicle brake system 10 can be measured during different braking event stages and used to populate the various look-up tables. In a different embodiment, the pressure compensation determined in step 112 is algorithmically determined or modeled, as opposed to being determined from a look-up table or other data structure. No matter how it is determined, the pressure compensation is meant to address pressure variations in vehicle braking system 10 such that the actual fluid pressure out at the vehicle wheels (and thus, the brake torque and brake force) accurately reflects that being requested by the driver. The preceding examples are provided in the context of actual fluid pressures, however, the pressure compensation may be expressed in terms of brake torque, brake force, or any other suitable form. Similarly, the plots in the graph of FIG. 4 are in terms of actual fluid pressures, however, pressure compensation may be provided as an offset value, percentage, ratio, multiplier, etc. In the case of an offset value, the pressure compensation could be a positive or negative number that is added or subtracted to the driver braking intent to arrive a compensated pressure. In the example above that relates to plot 206, an offset value of −2 bar could be provided as the output instead of 28 bar. This would instruct the system to subtract 2 Bar from the driver braking intent of 30 bar; thus, arriving at the same result. It is also possible for step 112 to utilize a first look-up table to calculate a pressure compensation for the front wheels, and use a second look-up table to calculate a pressure compensation for the rear wheels, or any other combination deemed appropriate. Any number of other embodiments and variations may also be used to determine a pressure compensation.

Step 114 uses the driver braking intent and the pressure compensation to generate compensated brake command signals that can then be used to operate one or more aspects of the vehicle brake system. In one embodiment, EBCM 16 generates and provides compensated brake command signals to hydraulic unit 18 which uses those signals to manipulate the fluid pressure seen at the various wheels. The fluid pressure at the wheels, in turn, dictates the corresponding brake torque and brake force. In a different brake-by-wire example, step 114 sends compensated brake command signals to a control unit or driver in an electromechanical braking (EMB) system so that an electric motor controls a brake torque or brake force according to the compensated brake command signal. In this example, EBCM 16 could generate separate compensated brake command signals for each wheel. In another embodiment, the compensated brake command is not implemented instantaneously and abruptly, but is smoothed through a linear equation or a first-order filter, to name but a few examples. These are only some of the possibilities, as other techniques may be used to control a vehicle brake system with compensated brake command signals.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for operating a vehicle brake system, comprising the steps of:
   (a) determining a driver braking intent;
   (b) determining a pressure compensation that compensates for fluid pressure variations in a master cylinder of the vehicle brake system, wherein the pressure compensation is determined with the use of empirically derived data accounting for imperfections in the operation of the master cylinder resulting in fluid pressure variations therein;
   (c) using the driver braking intent and the pressure compensation to generate compensated brake command signals that are compensated for fluid pressure variations in the master cylinder of the vehicle brake system; and
   (d) operating one or more aspects of the vehicle brake system according to the compensated brake command signals so that the effects of fluid pressure variations in the master cylinder of the vehicle brake system are mitigated.

2. The method of claim 1, wherein step (a) further comprises determining the driver braking intent by receiving a brake signal from a brake pedal sensor that senses the position, movement, exerted force, and/or state of a brake pedal.

3. The method of claim 1, wherein step (b) further comprises determining a braking event stage that is representative of a discrete stage, phase, segment and/or portion of a braking event, and using the braking event stage to determine the pressure compensation.

4. The method of claim 3, wherein the braking event stage is an apply stage, a steady-state stage, or a release stage.

5. The method of claim 3, wherein step (b) further comprises using the braking event stage to select a look-up table, and using the look-up table and the driver braking intent to determine the pressure compensation.

6. The method of claim 5, wherein the look-up table is a two-dimensional data structure that is specifically designed for a particular braking event stage and correlates the driver braking intent (input) with the pressure compensation that is needed in order to implement the driver braking intent (output).

7. The method of claim 5, wherein the look-up table is provided in terms of fluid pressure, brake torque, or brake force.

8. The method of claim 1, wherein step (d) further comprises operating one or more aspects of the vehicle brake system by sending the compensated brake command signals to a hydraulic unit, and using the hydraulic unit to control a fluid pressure within the vehicle brake system according to the compensated brake command signals.

9. The method of claim 1, wherein the vehicle brake system is an electrohydraulic braking (EHB) system.

10. A method for operating a vehicle brake system, comprising the steps of:
   (a) determining a driver braking intent;
   (b) determining a braking event stage that is representative of a discrete stage, phase, segment and/or portion of a braking event, and using the braking event stage to select a look-up table or other data structure from a plurality of such data structures each corresponding to a respective braking event stage, where the selected data structure is directed to that particular braking event stage and accounts for imperfections in the operation of the vehicle brake system resulting in fluid pressure variations therein during that particular braking event stage;
   (c) using the selected data structure and the driver braking intent to generate compensated brake command signals for the driver braking intent, wherein the compensated brake command signals are designed to compensate for fluid pressure variations that occur in a master cylinder of the vehicle brake system during that particular braking event stage and differ from fluid pressure variations that occur in other braking event stages; and (d) operating one or more aspects of the vehicle brake system according to the compensated brake command signals while the vehicle remains in the particular braking event stage.

11. The method of claim 10, wherein step (a) further comprises determining the driver braking intent by receiving a brake signal from a brake pedal sensor that senses the position, movement, exerted force, and/or state of a brake pedal.

12. The method of claim 10, wherein the braking event stage is an apply stage, a steady-state stage, or a release stage.

13. The method of claim 10, wherein the look-up table is a two-dimensional data structure that is specifically designed for a particular braking event stage and correlates the driver braking intent (input) with the pressure compensation that is needed in order to implement the driver braking intent (output).

14. The method of claim 10, wherein the look-up table is provided in terms of fluid pressure, brake torque, or brake force.

15. The method of claim 10, wherein step (d) further comprises operating one or more aspects of the vehicle brake system by sending the compensated brake command signals to a hydraulic unit, and using the hydraulic unit to control a fluid pressure within the vehicle brake system according to the compensated brake command signals.

16. The method of claim 10, wherein the vehicle brake system is an electrohydraulic braking (EHB) system.

\* \* \* \* \*

UNITED STATES PATENT AND TRADEMARK OFFICE
CERTIFICATE OF CORRECTION

PATENT NO. : 9,630,601 B2
APPLICATION NO. : 12/418907
DATED : April 25, 2017
INVENTOR(S) : Jon K. Logan et al.

Page 1 of 1

It is certified that error appears in the above-identified patent and that said Letters Patent is hereby corrected as shown below:

In the Specification

Column 1, Lines 4-7, please delete:
"This invention was made with U.S. Government support under Agreement No. GMT101X TMH, awarded by the Fuel Cell Vehicle Program. The U.S. Government may have certain rights to this invention."

Signed and Sealed this
Twenty-first Day of May, 2019

Andrei Iancu
*Director of the United States Patent and Trademark Office*